June 23, 1953  L. C. DERMOND ET AL  2,643,347
STARTER CONTROL SYSTEM
Filed April 24, 1951  3 Sheets-Sheet 1

INVENTORS
Lawrence C. Dermond
Ellsworth A. Kehoe
Willier Hardman
and Fehr
ATTORNEYS

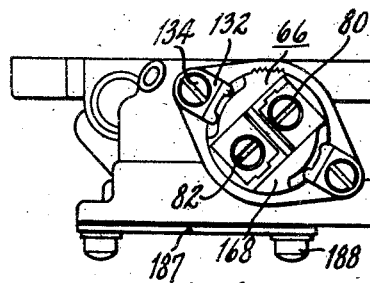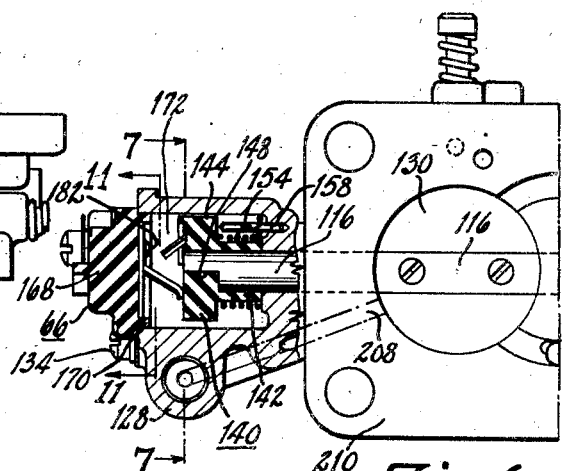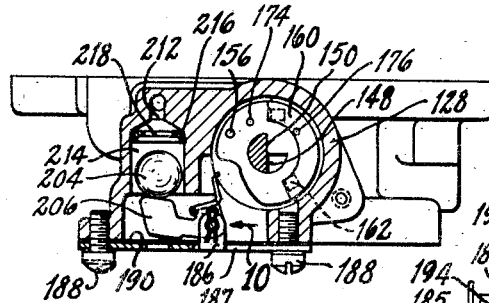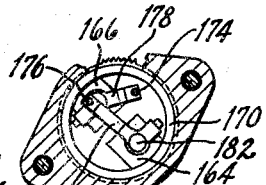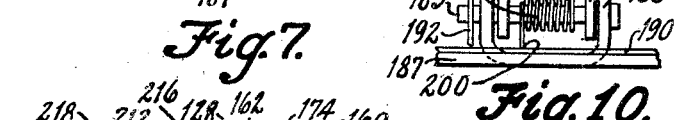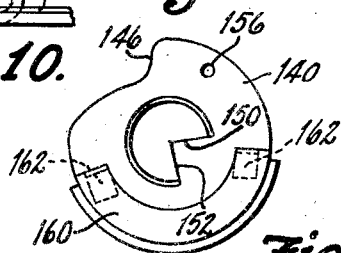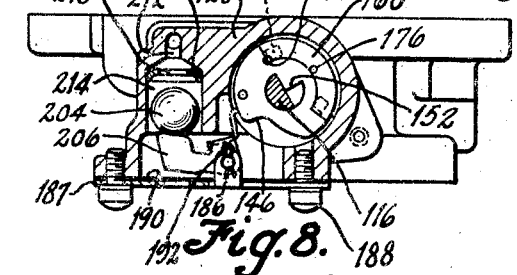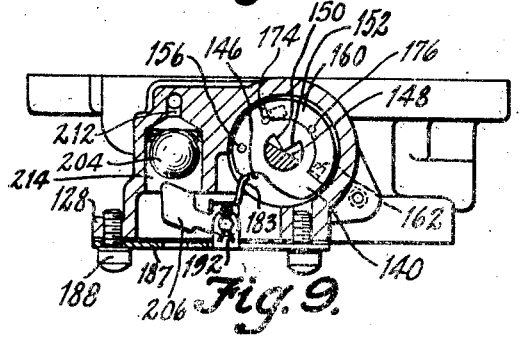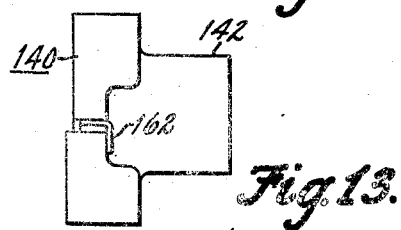

Patented June 23, 1953

2,643,347

UNITED STATES PATENT OFFICE 2,643,347

STARTER CONTROL SYSTEM

Lawrence C. Dermond and Ellsworth A. Kehoe, Rochester, N. Y., assignors to General Motors Corporation, Detroit, Mich., a corporation of Delaware Application April 24, 1951, Serial No. 222,674

20 Claims. (Cl. 290—38)

This invention relates to starting apparatus for internal combustion engines, more particularly for those of automotive vehicles and especially to the semi-automatic type of starting apparatus in which the starter circuit is closed by actuation of some one of the control instrumentalities of the vehicle, for example by operation of the carburetor throttle, when the engine is not running and in which the starter circuit is automatically prevented from being closed during self operation of the engine.

Starting apparatus of this general type is old and well known and certain difficulties have been encountered in designing a control switch for use in such apparatus which will remain closed during cranking of the engine under all conditions, but which will always be open when the engine is operating under its own power regardless of the engine operating conditions. This is due to the fact that when the engine is self operative, the engine suction under certain conditions, as when operating at heavy load with a wide open throttle, becomes quite low and will approach and may, indeed, even exceed under some extreme conditions, the engine suction which is created during cranking at high temperatures.

It is the primary object of the present invention to provide, in a starting apparatus of the type referred to, a control switch of improved construction which is operated by the carburetor throttle to close the starter control circuit and which is held open by engine suction when the engine is operating under its own power and which is of such a construction that it will never close during self operation of the engine, and which will never be opened during rotation of the engine by the starting motor.

It is a further object of the invention to provide such a control switch that is positive in its action, simple in construction, inexpensive, easy to manufacture and which can be readily mounted on the carburetor so as to be operated by the carburetor throttle shaft.

According to the present invention, these objects are attained by the provision of a control switch having a housing integral with or separately mounted on the carburetor casting in such a position that an extension of the throttle shaft projects into the switch housing. The housing is approximately of cylindrical form and its outer end is closed by a block of insulating material supporting two fixed contacts, connected to binding posts, from which wires lead to the starter control circuit. The fixed contacts cooperate with a movable contact mounted on a block of insulating material supported on the end of the throttle shaft and rotatable therewith under certain conditions, while under other conditions it is held stationary, permitting the throttle shaft to rotate without accompanying movement of the movable contact. To effect movement of the block of insulating material supporting the movable contact with the throttle shaft the block is connected to one end of a torsion spring, the other end of which is connected to a fixed pin in the housing and exerts a force to move the block of insulating material in the same direction as the throttle shaft is moved, when the throttle is opened. This force is effective to move the movable contact into position to close the control switch as the throttle is opened.

When the throttle is closed the movable contact is held against movement by engagement of a flat surface on the throttle shaft with a cooperating surface on the block of insulating material the usual throttle return spring being stronger than the torsion spring above referred to. As the throttle is opened the flat surface on its shaft is moved away from the cooperating flat surface on the block supporting the movable contact, but the torsion spring causes the block to move with the throttle shaft, holding the flat surfaces in engagement.

In order to prevent closing of the starter control switch during engine operation a latch engages the block of insulating material which supports the movable contact, so that the torsion spring cannot move the block with the throttle shaft, but the latch is moved to inoperative position by a suction operated ball. When the engine runs the ball is lifted by suction to permit movement of the latch to its operative position. The arrangement is such that a greater degree of suction is required to lift the ball than to maintain it in the position to which it is moved.

Further objects and advantages of the present invention will be apparent from the following description, reference being had to the accompanying drawings wherein a preferred embodiment of the present invention is clearly shown.

In the drawings:

Fig. 5 is an end elevation of the throttle body casting of the carburetor and the control switch, seen in the direction of the arrow 5 in Fig. 3.

Fig. 6 is a section on the line 6—6 of Fig. 3.

Figs. 7, 8 and 9 are all sections on the line 7—7 of Fig. 6, with the operating parts in different positions.

Fig. 10 is a detail view of the latch mechanism in the direction of the arrow 10 in Fig. 7.

Fig. 11 is a section on the line 11—11 of Fig. 6.

Figs. 12 and 13 are detail views of the block of insulating material and movable contact carried thereby.

Figure 1:
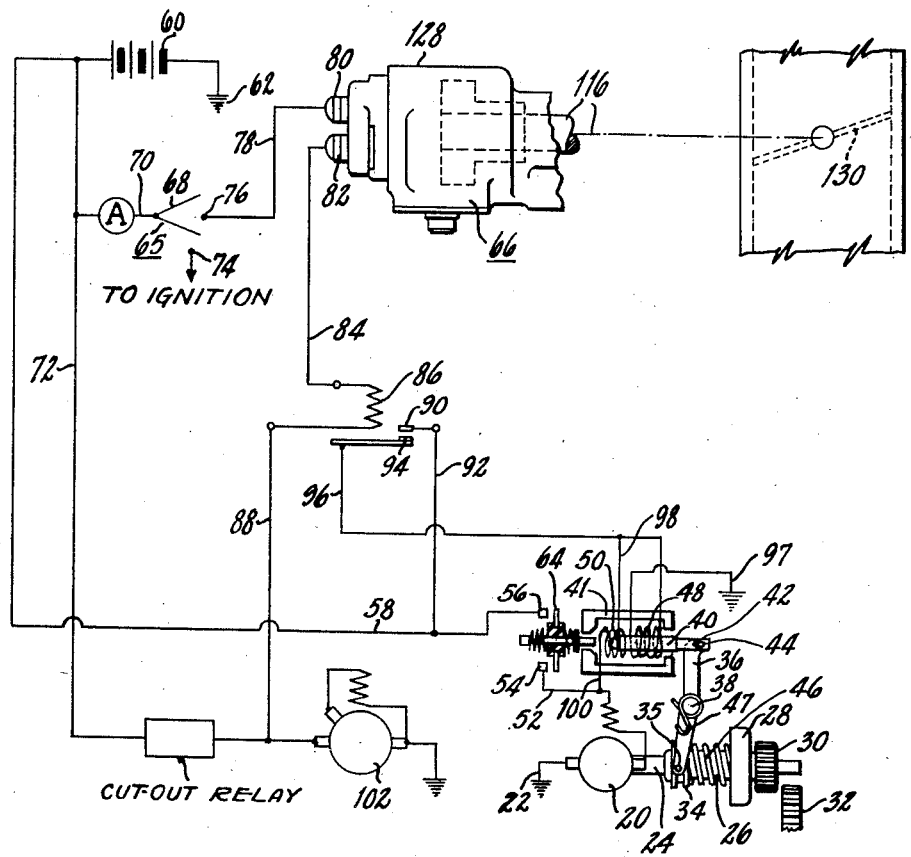
Fig. 1 is a diagrammatic view of a starter control system in which the control switch of the present invention is adapted to be used.

Referring to Fig. 1 of the drawings, the starting motor, which is indicated at 20, has a ground connection 22 and an armature shaft 24, on which is splined a sleeve 26 which is secured to one member of an overrunning clutch 28, the other member of which is integral with the driving pinion 30, adapted to be moved into engagement with the fly-wheel gear 32 of the engine, in order to rotate said gear and start the engine whenever the starting motor is operative. The sleeve 26 is moved to the right in Fig. 1 to effect engagement of the pinion 30 with gear 32 and the circuit between the starting motor and the battery is concurrently closed to cause the starting motor to become operative.

To this end the sleeve 26 is provided with a grooved collar 34 which is slidable on the shaft 24 and said collar is engaged by pins 35 which project from a yoke formed on the lower end of a lever 36, suitably pivoted at 38 and connected at its upper end with the armature 40 of an electromagnet 41, by means of a lost motion connection comprising a pin 42 and a slot 44 which is provided for the purpose of permitting the lever and the armature to have some motion relation to each other.

When the magnet is energized the lever 36 is rocked on its pivot in a counterclockwise direction, the collar 34 compressing a spring 46 which surrounds the sleeve 26 between the collar and the overrunning clutch 28, moving the pinion into engagement with the fly wheel gear in the usual manner. The construction of the mechanism between the starting motor and the fly wheel gear is the same as is ordinarily employed in manually operated starting devices of the overrunning clutch type. A spring 47 returns the lever 36 and the parts operated thereby to normal position when the above mentioned electromagnet is deenergized.

The electromagnet is provided with two coils 48 and 50 having a different number of turns for a purpose which is briefly described hereinafter and the circuit connections with the magnet coils will also be briefly described later.

The starting motor is connected by a wire 52 with a fixed contact 54 of a main starting motor switch which connects the starting motor with the battery, a second fixed contact 56 of said main switch being connected by a wire 58 with the battery 60 which is grounded at 62. A movable contact 64 is adapted to be moved into engagement with the two fixed contacts 54 and 56 when the armature of the electromagnet is moved to the left in Fig. 1, in order to close the circuit between the starting motor and the battery.

The energization of the electromagnet is effected by the closing of the ignition switch designated in its entirety as 65 and a second switch designated generally by the reference numeral 66, in series therewith, the construction of which constitutes the principal feature of novelty of the present invention and which will be described in detail later. The closing of these two switches effects closing of a magnetic switch which is in circuit with the coils of the above described electromagnet.

The ignition switch has a movable contact 68 connected by a wire 70 with a wire 72 extending from the generator to the wire 58 previously referred to. The contact 68 is a double contact, one branch of which engages a fixed contact 74 which is connected to a wire leading to the ignition system and the other branch of which engages a second fixed contact 76 to which is connected a wire 78, leading to a binding post 80 of the switch 66. The latter is provided with a second binding post 82 which is connected by a wire 84 to a winding 86 of a relay which is grounded through the generator by means of a wire 88. The switch 66 is provided with means to effect electrical connection between the two binding posts 80 and 82, this mechanism being described later, and when electrical connection between these binding posts is thus effected, current flows from the battery through the ignition switch across the binding posts 80 and 82 through the coil 86 and to ground to energize said coil and energization of the latter closes a switch to effect energization of the main magnet. The latter switch comprises a fixed contact 90 which is connected by a wire 92 to the wire 58 which leads to the battery while a movable contact 94 which cooperates with the fixed contact 90 is connected by a wire 96 to the coil 48 which is grounded through a connection 97 and a wire 98 connects the coil 50 with the wire 96, said coil being grounded through the starting motor by means of the wire 100 which connects the coil with the wire 52.

It will be obvious from the above description that when the ignition switch and the switch 66 are both closed, the coil 86 is energized and this effects closing of the contacts 90 and 94 which are normally open. When this occurs, current will flow from the battery through the wires 58 and 92, the contacts 90 and 94 and wires 96 and 98 to both coils 48 and 50 of the main electromagnet 41, energizing the magnet and effecting the shifting of the pinion and the closing of the main starter switch in the manner previously described.

The magnet is so constructed that one of the coils will be shunted out when the main starter switch is closed so that during the cranking period, when the starting motor is rotating the engine crank shaft, the starter switch is held closed by the force of only one of the coils of the main electromagnet. This mechanism constitutes no part of the present invention and all of the mechanism previously described with the exception of the construction and operating means for the switch 66 is shown and described in the patent to John B. Dyer, No. 2,302,687 granted November 24, 1942. In view of this complete disclosure and the fact that the specific arrangement of the circuit and construction of the magnet and starter drive are not portions of the present invention, it is unnecessary to further describe the starter system other than to state that the generator is indicated at 102 and is connected through the wire 88 with the relay coil 86, such wire connecting with the generator between the latter and the usual cut out relay, so that when the generator is in operation when the engine is operating under its own power, the generator will build up countervoltage in the coil 86 and will effect opening of the switch contacts 90 and 94 in the event that the switch 66 which is opened by engine suction should for some reason fail to open in response to the effect of engine suction when the engine is self operative.

Figure 2:
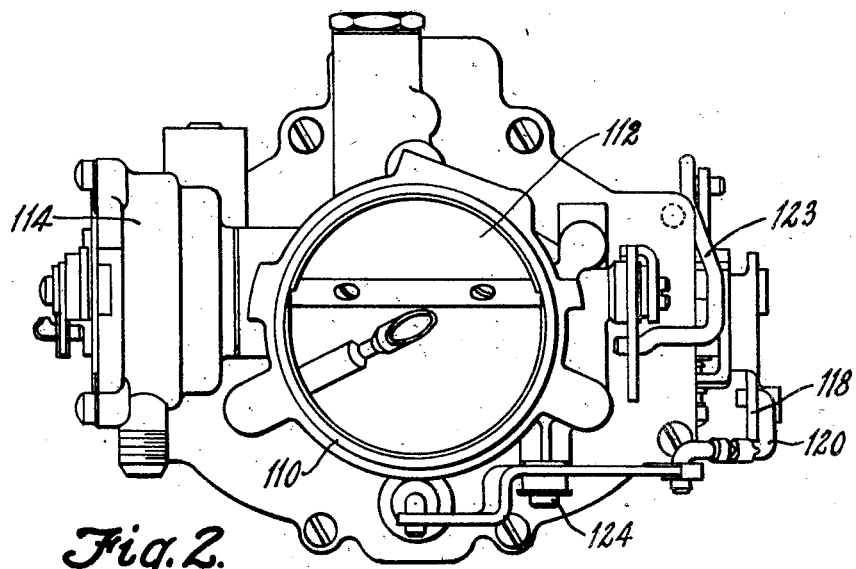
Figs. 2 and 3 are views in plan and elevation of a carburetor with which the starter control switch is associated, the automatic choke housing being omitted in Fig. 3.
Figure 3:
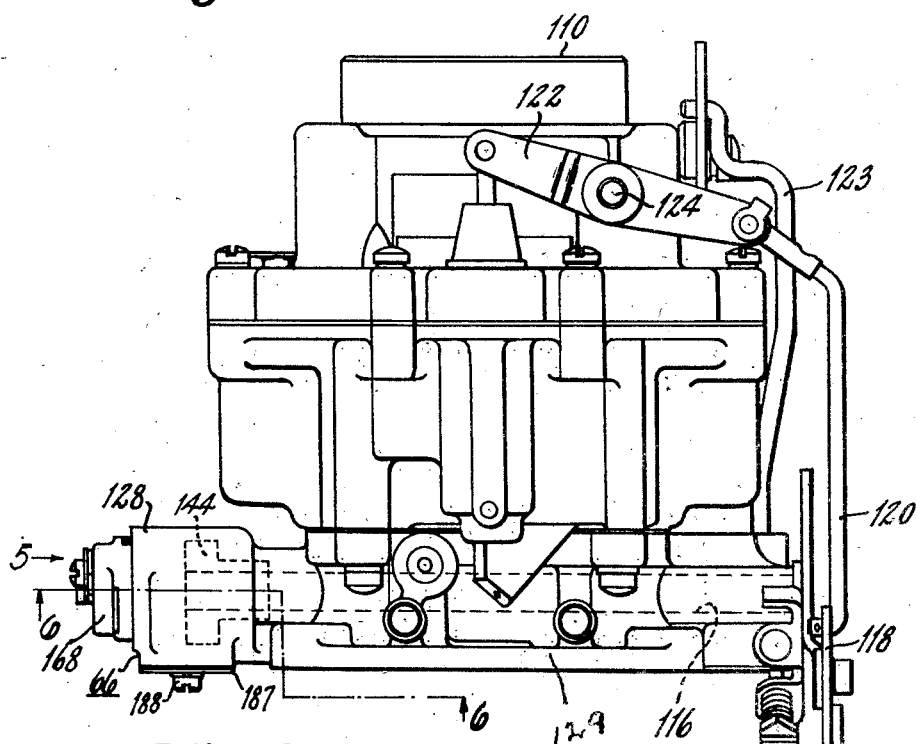

Coming now to the construction of the switch designated generally by the numeral 66, such switch is secured to the housing of the carburetor and is closed by operation of the shaft on which the carburetor throttle is mounted as such shaft is moved in a direction to open said throttle. In Figs. 2 and 3 of the drawings the carburetor is shown in outline to indicate the position of the control switch 66 with respect to other parts of the carburetor, but since the construction of the carburetor itself is not a part of nor material so far as the present invention is concerned, the interior construction of the carburetor is not disclosed. As shown in the drawings the carburetor, which is shown in outline, is of the dual type and is provided with two outlets each controlled by a separate throttle, but it will be understood that the present invention can be used either with a dual carburetor or one having single or multiple outlets. Also it will be noted that the housing for an automatic choke control mechanism is shown, but the present invention is in no way related to an automatic choke, and can be associated with a carburetor having a manual choke.

Figure 4:
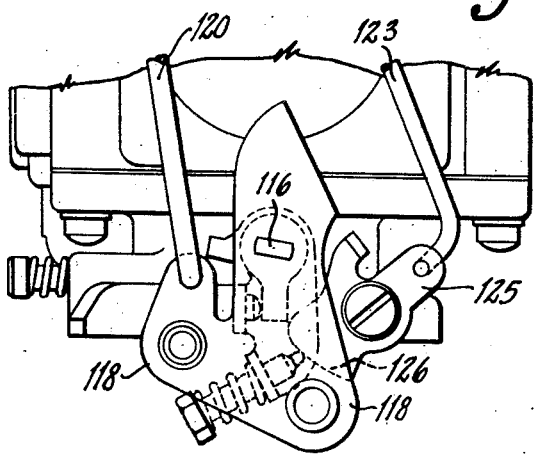
Fig. 4 is a fragmentary elevation showing the throttle operating levers of the carburetor.

In Fig. 2 of the drawings, which is a plan view of the carburetor, it will be noted that the carburetor has a single air intake 110 which is controlled by a choke valve 112 and, in the particular carburetor shown, the operation of this valve is controlled by an automatic control device which is located in the housing 114. The carburetor is of the down draft type and in the carburetor shown, there are two outlet passages controlled by two throttles which are secured to a shaft 116 extending across the carburetor, as indicated in Fig. 3 by dotted lines. This shaft is operated manually by an arm 118, shown in Fig. 4, and from this arm a link 120 extends upwardly to a lever 122 which is pivoted at 124 and operates the conventional form of accelerator pump. The link 123 which is shown in Fig. 4, is connected at its upper end to the choke valve 112 and at its lower end is connected to a lever 125 which positions a cam 126, operative to control the idling position of the throttle at low temperatures, in a manner well known. The operating arm 118 is connected to the shaft 116 and as shown in Fig. 6, this shaft 116 extends beyond the carburetor housing at the left end thereof and projects into a housing 128 in which the operating elements of the switch 66 are positioned. The housing 128 is secured to the carburetor casting 129 by any suitable means. One of the throttle valves 130 of the carburetor is shown as secured to the shaft 116 and in closed position in Figs. 1 and 6.

The switch 66 includes a movable contact which under some conditions is rotated with the throttle shaft into engagement with stationary contacts to close said switch and under other conditions is held stationary, while the throttle shaft rotates independently thereof to effect its normal function of controlling engine speed. This contact is moved by the throttle shaft as the throttle is opened, when the engine is inoperative, to establish electrical connection between two fixed contacts which are electrically connected to the binding posts 80 and 82, the said binding posts and fixed contacts being supported by a block of insulating material which is secured in the housing 128, by clips 132 held in clamping position by screws 134.

The movable contact is carried by a block of insulating material 140 which is of the shape shown in Figs. 12 and 13. Such block of insulating material has an extended portion 142 in the form of a cylindrical sleeve which surrounds the throttle shaft 116 and an enlarged head portion 144 which is partly cylindrical in form, but is cutaway to form a shoulder 146 for a purpose later set forth. The end of the throttle shaft 116 where such shaft extends into the head portion 144 of the block of insulating material is cut away to form a flat surface 148 while the interior of the head portion of the block of insulating material contiguous to this flattened part of the throttle shaft is cut away as indicated in Fig. 12 and has two flat surfaces 150 and 152, the surface 150 being normally held in engagement with the surface 148 of the throttle shaft when the engine is inoperative by means of torsion spring 154 one end of which engages in a hole 156 in the head portion of the block of insulating material while the other end of such spring engages a pin 158 secured in the switch housing.

The block of insulating material has a recess formed therein on the left face of the head portion 144 of such block and positioned in this recess is a movable contact 160, as shown in Fig. 12, which is provided with tangs 162 which extend through slots in the head portion 144 of the block of insulating material and are bent over as indicated in Fig. 13 to hold the fixed contact in position in the recess in which it is received. The contact is flush with the surface of the enlarged head portion 144 which lies normal to the axis of the throttle shaft and the movable contacts wipe on this surface and are engaged by the movable contact when the throttle shaft reaches a predetermined position, as it is moved in a direction to open the throttle.

There are two fixed contacts that are secured by rivets, or in any other suitable way, to two metallic inserts 164 and 166 which are embedded in a block of insulating material 168, and the binding posts 80 and 82 are also secured in any desirable way to these metallic inserts. The inserts are insulated from each other and from the metal housing of the control switch. The block of insulating material 168 is provided with a circular flange 170 which projects toward the right therefrom, as seen in Fig. 6, and extends into a cylindrical chamber 172 within the housing 128. The previously described clips 132, when tightened, hold the block 168 in position and these clips may be loosened and the block rotated to adjust the fixed contacts relative to the movable contact 160. By this adjustment the degree of opening of the throttle at the time the contact 160 engages both the fixed contacts can be determined and varied. For example, in Fig. 8, the throttle is opened approximately 30° to cause engagement of the fixed contacts with the movable contact. By adjusting the block 168 this engagement of the contacts can be caused to take place at a greater or less opening of the throttle than 30 degrees.

The fixed contacts are numbered 174 and 176 and comprise projections integral with and extending from two resilient strips 178 and 180 respectively which are formed of copper or other suitable material and extend toward the head 140 which carries the movable contact. These strips are secured by rivets 182 to the metal inserts 164—166 previously referred to and extend toward the face of the rotating block of insulating material 140 at an angle so that they engage this block of insulating material with sufficient pressure to make a good contact with the movable contact 160 when such movable contact is in position to be engaged thereby.

As already stated herein, the movable contact and the element 140 are rotated with the throttle shaft to bring the movable contact 160 into engagement with the two fixed contacts when it is desired to start the engine, but when the engine is running under its own power, this movement of the element 140 and the movable contact 160 with the throttle shaft is prevented, for the purpose of preventing any possible operation of the starting motor while the engine is self-operating. Obviously, if operation of the starting motor occurred under such conditions, the pinion 30 would be moved into engagement with the fly wheel gear 32 while the latter is rotating and serious damage to the starting mechanism might result. However, the throttle shaft must move when the engine is operating under its own power in order to control engine speed and means are provided, which are later described, enabling this movement of the throttle shaft while the element 140 and contact 160 are held against movement.

In order to prevent movement of the element 140 and the movable contact carried thereby, during self-operation of the engine, a latch 183 is adapted to engage the shoulder 146 on element 140, as shown in Fig. 9. This latch is secured to or integral with a yoke having two arms 184, pivotally mounted on a pin 185 which is supported in a U-shaped bracket 186, the arms of which project upwardly from a metal plate 187 which is secured to the switch housing 128 by screws 188, as shown in Fig. 7, and is separated therefrom by a screen 190. The pin 185 is prevented from any material longitudinal movement by a cotter pin 192, or any other suitable means. A torsion spring 194 has one end thereof 196 in engagement with the horizontal portion 198 of the yoke while the other end 200 of the spring engages the screen, as shown in Fig. 10, so that the spring normally tends to rock the latch in a clockwise direction, as seen in Fig. 7, to move the latch member into engagement with the previously mentioned shoulder 146.

When the engine is not in operation, this movement of the latch by the spring is prevented by a ball 204 which engages a tail-piece 206 integral with the latch and extending to the left as seen in Fig. 7, the weight of the ball being sufficient to overcome the force of the spring 194, which is of very slight strength.

Obviously, when the engine is not running and the ball is in the position shown in Fig. 7, the latch member is inoperative to hold the element 140 and movable contact against rotation so that said member and the contact can move with the throttle shaft to effect closing of the switch, but when the ball is moved out of engagement with the tail-piece 206 of the latch the spring 194 will move the latch clockwise toward the surface of the element 140 and when the throttle is moved to closed or idle position, at which time the parts are in the position shown in Fig. 7, the latch can engage the shoulder 146.

The ball is moved out of engagement with the tail-piece of the latch, when the engine begins to operate under its own power, by the effect of engine suction and for this purpose a suction passage 208 is provided in the wall of the carburetor housing. This passage terminates in the intake passage at a suitable point between the throttle and the lower face of a flange 210 which, when the carburetor is assembled on the manifold, rests upon a corresponding flange of the manifold so that the passage 208 is subject to the high vacuum which is maintained between the throttle valve and the engine when the engine is in operation and the throttle only partly open. The passage 208 connects with a short passage 212, shown in Figs. 7, 8 and 9, which at its lower end communicates with the bore 214 formed in the wall of the switch housing 28 and which is of slightly greater diameter than the ball 204, so that there is some degree of leakage around the ball, between it and the wall of said bore. Positioned in this bore above the ball and comprising a seat therefor, is an annular element 216 made of copper or some other suitable material and having an orifice 218 therein, which is closed by the ball when it is lifted by engine suction to the position shown in Fig. 9.

The operation of the control switch can be best understood from Figs. 7, 8 and 9 of which Fig. 7 illustrates the position of the parts when the engine is not running, while Fig. 8 shows the position of the parts while the engine is being rotated by the starting motor and the throttle is approximately 30° open and Fig. 9 indicates the position of the parts when the engine is running under its own power and the throttle is opened to about 60°.

It will be clear from examination of Fig. 7, that when the engine is inoperative the latch member, as already set forth, is in such position that it is ineffective to prevent any rotation of the element 140 and said element is held in such position by the torsion spring 154 that the surface 150 is in engagement with the flat surface 148 of the cut away portion of the throttle shaft 116. When the parts are in the Fig. 7 position the throttle is substantially closed. As the throttle is moved toward open position, the throttle shaft 116 is moved counterclockwise in Fig. 7, tending to move the surface 148 away from the surface 150, but as the shaft is so moved the torsion spring 154 causes the element 140 to rotate counterclockwise with the shaft. When the throttle has been moved to a position where it is about 30° open the various parts have been moved to the position shown in Fig. 8.

In Figs. 7, 8 and 9, the position of the fixed contacts is indicated by the circles 174 and 176 and it will be clear that when the parts are in the position shown in Fig. 7, the contact 176 is in engagement with the movable contact 160, but contact 174 is not in engagement therewith and the circuit through the switch is not closed. However when the element 140 and contact 160 are moved to the position shown in Fig. 8, the movable contact has been moved sufficiently for both of the contacts 174 and 176 to be engaged by contact 160 and when in such position the circuit through the control switch is closed and the starting motor is caused to operate.

This operation of the starting motor will cause the engine to be started and the suction of the engine which is communicated to the bore 214 will lift the ball 204 to the position shown in Fig. 9. Lifting of the ball will permit the weak spring 194 to move the latch 183 clockwise until the end of such latch rides on the peripheral surface of the element 140, as shown in Fig. 8, but the latch cannot engage the shoulder 146 because, as is indicated in Fig. 8, such shoulder has moved beyond the latch. However, when the engine has started to run under its own power, the operator permits the throttle to move to closed position restoring the element 140 to the position shown in Fig. 7 and this will permit the latch to be moved by spring 194 into a position in advance of the shoulder 146 so that when the throttle is open to effect an increase in engine speed, the shoulder 146 will engage the latch in order to hold the element 140 against any further movement, while the throttle can continue to move toward open position. As this movement of the throttle continues, the surface 148 is moved away from the surface 150 so that when the throttle is about 60% open, the relative positions of the throttle shaft and the element 140 are as shown in Fig. 9 with the surfaces 148 and 150 separated to some extent. As the throttle continues to move toward open position, the surface 148 will continue to move away from the surface 150 until the surface 148 will come into contact with the surface 152 on the element 140, when the throttle has been moved about 90° and is fully open.

It will be clear from the foregoing that the latch is effective to hold the element 140 in such a position, during the operation of the throttle to control the engine speed while the engine is self-operative, that the movable contact 160 will never engage both contacts 174, 176 and the control switch will not be closed. It will be noted that contact 176 will engage contact 160 in all positions of the element 140.

It will be understood that because of the leakage between the ball 204 and the wall of bore 214 a greater degree of suction will be required to lift the ball to the position shown in Fig. 9 than is required to hold the ball in such position after it has been lifted thereto so that a greater degree of suction is required to lift the ball than is obtained during cranking of the engine by the starting motor but a suction less than that maintained during self operation of the engine will hold the ball in lifted position. In other words, this arrangement is designed to prevent any lifting of the ball during cranking and any dropping of the ball during operation of the engine under its own power. This arrangement is necessary because under some extreme engine operating conditions there might be so great a temporary drop in the engine suction posterior to the throttle that it might approach or even overlap the suction which is maintained during cranking of the engine. If the same amount of suction is necessary to hold the ball in its elevated position during engine operation as is required to lift the ball to such position, the ball might drop while the engine is operating and for this reason, the structure disclosed is provided, making it necessary to have a considerably greater suction to lift the ball when the engine is cranking than to maintain it in its elevated position when the engine is operating.

Furthermore, as an additional safe guard against any possible release of the latch and the closing of the control switch during engine operation, which would result therefrom, the torsion spring 154 is of such strength that the frictional resistance between the latch member 183 and the shoulder 146 is so great the weight of the ball is not enough to overcome it. Therefore, even if the engine suction dropped during self operation of the engine to such an extent that the ball would be permitted to fall the weight of the latter is insufficient to overcome the resistance to the movement of the latch and the latch would remain in the position shown in Fig. 9, holding the element 140 and the movable contact against rotation. If the throttle is moved back toward closed position where the spring 154 would not hold the shoulder 146 against the toe of the latch the ball could never drop because at closed throttle and until the throttle gets relatively wide open the engine suction never falls sufficiently for the ball to drop. In other words, if the throttle is open far enough to bring about a possible drop in engine suction sufficient to permit the ball to fall the latch could not be moved by the weight of the ball to its disengaging position.

While the embodiment of the present invention as herein disclosed, constitutes a preferred form, it is to be understood that other forms might be adopted, all coming within the scope of the claims which follow.

What is claimed is as follows:

1. In a starting apparatus for internal combustion engines having a starting motor, a current source, a circuit for connecting said motor with the current source, a control switch for controlling the opening and closing of said circuit, a manually operable means for closing said switch to cause the starting motor to become operative, a member movable to a position to prevent the closing of said switch by actuation of said manually operable means when the engine is operating under its own power, means for moving said member to a position where it is ineffective when the engine is inoperative so that the control switch can be closed and means whereby the engine is effective when it becomes self-operative to move said last named means to a position to permit movement of said member to a position where it prevents closing of the control switch, so that closing of the control switch is prevented when the engine is operating under its own power.

2. In a starting apparatus for internal combustion engines having a starting motor, a current source, a circuit for connecting said motor with the current source, a control switch for controlling the opening and closing of said circuit, a movable switch closing member, a manually operable means for moving said member to close the switch in order to cause the starting motor to become operative, a latch member movable to a position to permit movement of said switch closing member by its operating means, means for moving the latch member to inoperative position when the engine is not in operation so that the control switch can be closed and means whereby the engine is effective, when it becomes self-operative to move said last named means to a position to permit movement of the latch to prevent closing of the control switch when the engine is operating under its own power.

3. In a starting apparatus for internal combustion engines having a starting motor, a current source, a circuit for connecting said motor with the current source, a control switch for controlling the opening and closing of said circuit, a movable switch closing member, a manually operable means for moving said member to close the switch in order to cause the starting motor to become operative, a latch member movable to a position to permit movement of said switch closing member by its operating means, means for moving the latch member to inoperative position when the engine is not in operation so that the control switch can be closed, means whereby the engine is effective, when it becomes self-operative to move said last named means to a position to permit movement of the latch to prevent closing of the control switch when the engine is operating under its own power and means for moving said latch member to its operative position.

4. In a starting apparatus for internal combustion engines having a starting motor, a current source, a circuit for connecting said motor with the current source, a control switch for controlling the opening and closing of said circuit, a movable switch closing member, a manually operable means for moving said member to close the switch in order to cause the starting motor to become operative, a latch member movable to a position to permit movement of said switch closing member by its operating means, means for moving the latch member to inoperative position when the engine is not in operation so that the control switch can be closed, means whereby the engine is effective, when it becomes self-operative to move said last named means to a position to permit movement of the latch to prevent closing of the control switch when the engine is operating under its own power and a spring for moving said latch member to its operative position when the engine is self-operative.

5. In a starting apparatus for internal combustion engines having a starting motor, a current source, a circuit for connecting said motor with the current source, a control switch for controlling the opening and closing of said circuit, a movable switch closing member, a manually operable means for moving said member to close the switch in order to cause the starting motor to become operative, a latch member movable to a position to permit movement of said switch closing member by its operating means, suction operated means for moving the latch member when the engine is inoperative so that the control switch can be closed, and means for communicating the engine suction to said last named means when the engine is self-operative to move said means to an inoperative position in order to permit movement of the latch member to effective position so as to prevent closing of the control switch.

6. In a starting apparatus for internal combustion engines having a starting motor, a current source, a circuit for connecting said motor with the current source, a carburetor for supplying combustible mixture to the engine and having a movable throttle valve for regulating the quantity of such mixture, a control switch for controlling the opening and closing of said circuit, means operable by the throttle to effect closing of said control switch in order to cause the starting motor to become operative, a latch operable to prevent closing of the switch during operation of the engine under its own power, a suction operated member controlling the operation of said switch and normally occupying a position to render said latch inoperative and to permit closing of the switch, and means communicating the suction of the engine to said member in order to move said member to a position to permit the latch to become operative when the engine starts to operate under its own power.

7. In a starting apparatus for internal combustion engines having a starting motor, a current source, a circuit for connecting said motor with the current source, a carburetor for supplying combustible mixture to the engine and having a movable throttle valve for regulating the quantity of such mixture, a control switch for controlling the opening and closing of said circuit, means operable by the throttle to effect closing of said control switch in order to cause the starting motor to become operative, a latch operable to prevent closing of the switch during operation of the engine under its own power, a member controlling operation of the latch and normally occupying a position to hold the latch in ineffective position, and means whereby the engine moves said last named member to a position where it is ineffective when the engine starts to run under its own power, in order to prevent movement of the latch to its operative position.

8. In a starting apparatus for internal combustion engines having a starting motor, a current source, a circuit for connecting said motor with the current source, a carburetor for supplying combustible mixture to the engine and having a movable throttle valve for regulating the quantity of such mixture, a control switch for controlling the opening and closing of said circuit, a contact member operatively movable in response to movements of the throttle to effect closing of the control switch in order to cause the starting motor to become operative, a latch operable to prevent movement of said contact member when the throttle is operated during engine operation, a member controlling operation of the latch and normally occupying a position to hold the latch in ineffective position, and means whereby the engine moves said last named member to a position where it is ineffective when the engine starts to run under its own power, in order to permit movement of the latch to its operative position.

9. In a starting apparatus for internal combustion engines having a starting motor, a current source, a circuit for connecting said motor with the current source, a carburetor for supplying combustible mixture to the engine and having a movable throttle valve for regulating the quantity of such mixture, a control switch for controlling the opening and closing of said circuit, a contact member operable in response to movements of the throttle to effect closing of the control switch in order to cause the starting motor to become operative, a resilient operating means for moving said contact member when the throttle is moved, whereby the throttle can move without accompanying movement of said contact member, a latch operable to prevent movement of said contact member when the throttle is operated during operation of the engine under its own power, a member controlling operation of the latch and normally occupying a position to hold the latch in ineffective position, and means whereby the engine moves said last named member to a position where it is ineffective when the engine starts to run under its own power, in order to permit movement of the latch to its operative position.

10. In a starting apparatus for internal combustion engines having a starting motor, a current source, a circuit for connecting said motor with the current source, a carburetor for supplying combustible mixture to the engine and having a throttle valve operable by a manually movable throttle shaft for regulating the quantity of such mixture supplied to the engine, a control switch for controlling the opening and closing of said circuit having a contact member supported on said shaft and movable therewith when the engine is not in operation to effect closing of the control switch to cause the starting motor to become operative, an operating means for moving said contact member when the throttle is moved, so constructed that said shaft can move without moving said contact member, a latch operable to prevent movement of said contact member when the throttle shaft is operated during operation of the engine under its own power, a member controlling operation of the latch and normally occupying a position to hold the latch in ineffective position, and means whereby the engine moves said last named member to a position where it is ineffective when the engine starts to run under its own power, in order to permit movement of the latch to its operative position.

11. In a starting apparatus for internal combustion engines having a starting motor, a current source, a circuit for connecting said motor with the current source, a carburetor for supplying combustible mixture to the engine and having a throttle valve operable by a manually movable throttle shaft for regulating the quantity of such mixture supplied to the engine, a control switch for controlling the opening and closing of said circuit having a contact member supported on said shaft and movable therewith when the engine is not in operation to effect closing of the control switch to cause the starting motor to become operative, an operating means for moving said contact member when the throttle is moved, so constructed that said shaft can move without moving said contact member, a latch operable to prevent movement of said contact member when the throttle shaft is operated during operation of the engine under its own power, a suction operated member normally engaging the latch when the engine is not running and effective to hold the latch in its inoperative position so that the contact member will be moved with the throttle shaft, and a conduit communicating with the engine suction to said member so that when the engine becomes self operative the suction is effective to move said member and permit movement of the latch to a position where it will prevent movement of said contact member with the throttle shaft and will prevent closing of the control switch during operation of the engine under its own power.

12. In a starting apparatus for internal combustion engines having a starting motor, a current source, a circuit for connecting said motor with the current source, a carburetor for supplying combustible mixture to the engine and having a throttle valve operable by a manually movable throttle shaft for regulating the quantity of such mixture supplied to the engine, a control switch for controlling the opening and closing of said circuit having a contact member supported on said shaft and movable therewith, to effect closing of the control switch, a resilient connection for moving said contact member with the throttle shaft whereby movement of the shaft independently of said contact member is permitted, a latch movable to engage the contact member when the engine is self-operative so as to prevent movement of said member to switch closing position, and a suction operated member operable to engage and hold said latch in its inoperative position when the engine is not operative and movable by suction to permit movement of the latch to its effective position when the engine is operating under its own power.

13. In a starting apparatus for internal combustion engines having a starting motor, a current source, a circuit for connecting said motor with the current source, a carburetor for supplying combustible mixture to the engine and having a throttle valve operable by a manually movable throttle shaft for regulating the quantity of such mixture supplied to the engine, a control switch for controlling the opening and closing of said circuit having a contact member supported on said shaft and movable therewith to effect closing of the control switch, a resilient connection for moving said contact member with the throttle shaft whereby movement of the shaft independently of said contact member is permitted, a latch movable to engage the contact member when the engine is self-operative so as to prevent movement of said member to switch closing position, a suction operated member operable to engage and hold said latch in its inoperative position when the engine is not operative and movable by suction to permit movement of the latch to its effective position when the engine is operating under its own power and a spring for moving the latch to its effective position when the engine suction becomes effective to move said suction operated member.

14. In a starting apparatus for internal combustion engines having a starting motor, a current source, a circuit for connecting said motor with the current source, a carburetor for supplying combustible mixture to the engine and having a throttle valve operable by a manually movable throttle shaft for regulating the quantity of such mixture supplied to the engine, a control switch for controlling the opening and closing of said circuit having a contact member supported on said shaft and movable therewith when the engine is not in operation to effect closing of the control switch to cause the starting motor to become operative, said shaft having a flat surface formed thereon engageable by a cooperating flat surface formed on said contact member, resilient means holding said flat surfaces in engagement whereby the contact member may be moved with said shaft, said contact member having a cut away portion permitting the flat surface of the shaft to be moved out of engagement with the cooperating flat surface of the contact member if said contact member is held against movement, and means holding the contact member against movement when the engine is operating under its own power in order to prevent movement of said contact member to switch closing position.

15. In a starting apparatus for internal combustion engines having a starting motor, a current source, a circuit for connecting said motor with the current source, a carburetor for supplying combustible mixture to the engine and having a throttle valve operable by a manually movable throttle shaft for regulating the quantity of such mixture supplied to the engine, a control switch for controlling the opening and closing of said circuit having a contact member supported on said shaft and movable therewith when the engine is not in operation to effect closing of the control switch to cause the starting motor to become operative, said shaft having a flat surface formed thereon, engageable by a cooperating flat surface formed on said contact member, resilient means holding said flat surfaces in engagement whereby the contact member may be moved with said shaft, said contact member having a cut away portion permitting the flat surface of the shaft to be moved out of engagement with the cooperating flat surface of the contact member if said contact member is held against movement, means holding the contact member against movement when the engine is operating under its own power in order to prevent movement of said contact member to switch closing position and means operable when the engine is inoperative to move said holding means to a position where it is ineffective.

16. In a starting apparatus for internal combustion engines having a starting motor, a current source, a circuit for connecting said motor with the current source, a carburetor for supplying combustible mixture to the engine and having a throttle valve operable by a manually movable throttle shaft for regulating the quantity of such mixture supplied to the engine, a control switch for controlling the opening and closing of said circuit having a contact member supported on said shaft and movable therewith when the engine is not in operation to effect closing of the control switch to cause the starting motor to become operative, said shaft having a flat surface formed thereon, engageable by a cooperating flat surface formed on said contact member, resilient means holding said flat surfaces in engagement whereby the contact member may be moved with said shaft, said contact member having a cut away portion permitting the flat surface of the shaft to be moved out of engagement with the cooperating flat surface of the contact member if said contact member is held against movement, a latch member for holding the contact member against movement when the engine is self-operative in order to prevent movement of the contact member to switch closing position, and suction operated means operable when the engine is inoperative to move the latch to ineffective position and movable by suction when the engine is operating under its own power to a position where it is ineffective with respect to said latch member.

17. In a starting apparatus for internal combustion engines having a starting motor, a current source, a circuit for connecting said motor with the current source, a carburetor for supplying combustible mixture to the engine and having a throttle valve operable by a manually movable throttle shaft for regulating the quantity of such mixture supplied to the engine, a control switch for controlling the opening and closing of said circuit having a contact member supported on said shaft and rotatable therewith into position to close said control switch in order to cause operation of the starting motor, but so arranged that said shaft is rotatable relatively to said contact member, a latch member for holding said contact member against rotation with said shaft when the engine is self-operative to prevent closing of the control switch and means operable when the engine is not running to disengage said latch from the contact member in order to permit movement of the latter to close said switch.

18. In a starting apparatus for internal combustion engines having a starting motor, a current source, a circuit for connecting said motor with the current source, a carburetor for supplying combustible mixture to the engine and having a throttle valve operable by a manually movable throttle shaft for regulating the quantity of such mixture supplied to the engine, a control switch for controlling the opening and closing of said circuit having said control switch comprising a movable contact member and a pair of fixed contacts cooperating therewith, one of which engages the movable contact in all positions of the latter, means operable with the throttle as the latter is moved toward open position for moving the movable contact member into position to engage both said fixed contacts in order to close the control switch and cause the starting motor to become operative, a latch member for holding the movable contact in a position where it engages only one of said fixed contacts under all operating conditions when the engine is operating under its own power, and means operable by the engine for dis-engaging the latch member from the movable contact member when the engine is not running in order to permit movement of said contact member to close said control switch.

19. In a starting apparatus for internal combustion engines having a starting motor, a current source, a circuit for connecting said motor with the current source, a control switch for controlling the opening and closing of said circuit, a movable switch closing member, a manually operable means for moving said member to close the switch in order to cause the starting motor to become operative, a latch member movable to a position to permit movement of said switch closing member by its operating means, a suction operated member movable into engagement with the latch member when the engine is not in operation and having sufficient weight to move said latch member to inoperative position in order to permit closing of the control switch, and means for communicating the engine suction to said suction operated member so that it is moved out of engagement with said latch member when the engine starts to run under its own power in order to permit movement of the latch member to a position where it prevents closing of said control switch.

20. In a starting apparatus for internal combustion engines having a starting motor, a current source, a circuit for connecting said motor with the current source, a control switch for controlling the opening and closing of said circuit, a movable switch closing member, a manually operable means for moving said member to close the switch in order to cause the starting motor to become operative, a latch member movable to a position to permit movement of said switch closing member by its operating means, a suction operated member movable into engagement with the latch member when the engine is not in operation and having sufficient weight to move said latch member to inoperative position in order to permit closing of the control switch, means for communicating the engine suction to said suction operated member so that it is moved out of engagement with said latch member when the engine starts to run under its own power in order to permit movement of the latch member to a position where it prevents closing of said control switch, said last named means being so constructed that a greater suction is required to move the suction operated member out of engagement with the latch member than is required to hold it out of engagement with said latch member.

LAWRENCE C. DERMOND.
ELLSWORTH A. KEHOE.

(References on following page)

References Cited in the file of this patent

UNITED STATES PATENTS

| Number | Name | Date |
|---|---|---|
| Re. 22,385 | Coffey | Oct. 26, 1943 |
| 1,635,078 | Gilbert | July 5, 1927 |
| 1,862,006 | Collins | June 7, 1932 |
| 2,021,502 | Ferguson | Nov. 19, 1935 |
| 2,041,541 | Good | May 19, 1936 |
| 2,055,976 | Harty | Sept. 29, 1936 |
| 2,101,931 | Dyer | Dec. 14, 1937 |
| 2,302,687 | Dyer | Nov. 24, 1942 |
| 2,326,125 | Dermond | Aug. 10, 1943 |
| 2,399,542 | Collins | Apr. 30, 1946 |

FOREIGN PATENTS

| Number | Country | Date |
|---|---|---|
| 386,704 | Great Britain | June 26, 1933 |